US008431886B2

(12) United States Patent
Grothe, Jr.

(10) Patent No.: US 8,431,886 B2
(45) Date of Patent: Apr. 30, 2013

(54) ESTIMATION OF ION CYCLOTRON RESONANCE PARAMETERS IN FOURIER TRANSFORM MASS SPECTROMETRY

(75) Inventor: Robert A. Grothe, Jr., Burlingame, CA (US)

(73) Assignee: Cedars-Sinai Medical Center, Los Angeles, CA (US)

(*) Notice: Subject to any disclaimer, the term of this patent is extended or adjusted under 35 U.S.C. 154(b) by 0 days.

(21) Appl. No.: 13/552,150

(22) Filed: Jul. 18, 2012

(65) Prior Publication Data

US 2013/0018600 A1 Jan. 17, 2013

Related U.S. Application Data

(63) Continuation of application No. 12/302,407, filed as application No. PCT/US2007/069811 on May 25, 2007, now Pat. No. 8,274, 043.

(60) Provisional application No. 60/808,909, filed on May 26, 2006.

(51) Int. Cl.
*B01D 59/44* (2006.01)

(52) U.S. Cl.
USPC ............... 250/282; 250/281; 702/20; 702/85; 702/89

(58) Field of Classification Search .................. 250/281, 250/282; 702/20, 85, 89
See application file for complete search history.

(56) References Cited

U.S. PATENT DOCUMENTS

| | | | | |
|---|---|---|---|---|
| 4,945,234 | A * | 7/1990 | Goodman et al. | 250/291 |
| 4,959,543 | A * | 9/1990 | McIver et al. | 250/291 |
| 6,498,340 | B2 | 12/2002 | Anderson et al. | |
| 6,608,302 | B2 * | 8/2003 | Smith et al. | 250/252.1 |
| 6,906,320 | B2 * | 6/2005 | Sachs et al. | 250/282 |
| 7,348,553 | B2 | 3/2008 | Wang et al. | |
| 7,493,225 | B2 * | 2/2009 | Wang et al. | 702/85 |
| 7,577,538 | B2 * | 8/2009 | Wang | 702/85 |

(Continued)

FOREIGN PATENT DOCUMENTS

| | | |
|---|---|---|
| WO | WO0070649 | 11/2000 |
| WO | WO2006130787 | 12/2006 |
| WO | WO2007140341 | 12/2007 |

OTHER PUBLICATIONS

Extended EP Search Report fo rEP App No. 077978039.

(Continued)

*Primary Examiner* — David A Vanore
(74) *Attorney, Agent, or Firm* — Hema Vakharia-Rao; Nixon Peabody LLP

(57) ABSTRACT

The present invention comprises a method and system for accurate estimation of the ion cyclotron resonance (ICR) parameters in Fourier-transform mass spectrometry (FTMS/FT-ICR MS). The parameters are essential to estimating the mass to charge ratio of an ion from FT-ICR MS data, the intended purpose of the instrument. Achieving greater accuracy in the parameters assists in greater accuracy of the mass to charge ratio of an ion, and obtaining an accurate estimation of the mass to charge ratio of an ion further aides in detecting mass with sub-ppm accuracy. Estimating mass in this manner enhances identification and characterization of large molecules. The inventive method and system thereby enhances the data obtained by conventional FTMS by accurately estimating ICR parameters. Ultimately, accurate estimates of the masses of molecules and detection and characterization of molecules from FT-ICR MS data are obtained.

12 Claims, 7 Drawing Sheets

U.S. PATENT DOCUMENTS

| | | | | |
|---|---|---|---|---|
| 7,816,647 | B2 * | 10/2010 | Agus | 250/291 |
| 8,094,313 | B2 * | 1/2012 | Kluczynski et al. | 356/437 |
| 8,129,678 | B2 * | 3/2012 | Dahl et al. | 250/291 |
| 8,158,930 | B2 * | 4/2012 | Grothe, Jr. | 250/282 |
| 8,274,043 | B2 | 9/2012 | Grothe | |
| 2002/0059047 | A1 * | 5/2002 | Haaland | 703/2 |
| 2002/0130259 | A1 * | 9/2002 | Anderson et al. | 250/281 |
| 2003/0078739 | A1 * | 4/2003 | Norton et al. | 702/22 |
| 2004/0024552 | A1 * | 2/2004 | Bowdler | 702/89 |
| 2004/0113063 | A1 * | 6/2004 | Davis | 250/282 |
| 2005/0026198 | A1 * | 2/2005 | Balac Sipes et al. | 435/6 |
| 2005/0029441 | A1 * | 2/2005 | Davis | 250/281 |
| 2005/0086017 | A1 * | 4/2005 | Wang | 702/85 |
| 2006/0124845 | A1 * | 6/2006 | Makarov et al. | 250/282 |
| 2006/0169883 | A1 * | 8/2006 | Wang et al. | 250/282 |
| 2006/0217911 | A1 * | 9/2006 | Wang | 702/85 |
| 2007/0273385 | A1 * | 11/2007 | Makarov et al. | 324/464 |
| 2008/0203284 | A1 * | 8/2008 | Grothe Jr. | 250/252.1 |
| 2009/0278037 | A1 * | 11/2009 | Grothe, Jr. | 250/282 |

OTHER PUBLICATIONS

IPRP WrittenOpinion for PCTUS200621321.
IPRP WrittenOpinion for PCTUS200769811.
ISR for PCT/US2006/21321.
ISR for PCT/US2007/69811.
Office Action in U.S. Appl. No. 11/914,588, dated Apr. 19, 2010.
Office Action in U.S. Appl. No. 11/914,588, dated Oct. 19, 2010.
Office Action in U.S. Appl. No. 11/914,588, Feb. 3, 2011.
Office Action in U.S. Appl. No. 11/914,588, dated Jun. 15, 2011.
Supplemental EPSearch Report for EP App No. EP 06771860.
Bernauth, P. Fourier techniques. Encyclopedia of Analytical Science 2005 vol. 3 pp. 498-504.
Beu, S.C. et al., Broadband Phase Correction of FT-ICR Mass Spectra via Simultaneous Excitation and Detection, Analytical Chemistry, 2004, 76:19, pp. 5756-5761.
Bruce, et al. “Obtaining more accurate Fourier transform ion cyclotron resonance mass measurements without internal standards using mulitply charged ions,” J. Am. Soc. Mass Spectrom., 2000, vol. 11, 416-421.
Cooper, et al. “Electrospray ionization Fourier transform mass spectrometric analysis of wine,” J. Agric. Food Chem., 2001, vol. 49, 5710-5718.
Dempster, et al., “Maximum likelihood from incomplete data via the $EM$ algorithm,” Journal of the Royal Statistical Society, Series B (Methodological), vol. 39, No. 1 (1977), pp. 1-38.
Easterling, M.L. et al., “Routine Part-per-Milliion Mass Accuracy for High-Mass Ions: Space-Charge Effects in Maldi FT-ICR”, Anal. Chem., 1999, 71(3):624-632.
Feng Xian et al., Automated broadband phase correction of Fourier transform ion cyclotron resonance mass spectra. Analytical Chemistry 2010 vol. 82 pp. 8807-8812.
Giancaspro, C. et al., Exact interpolation of Fourier transform spectra. Allied Spectroscopy 1993 vol. 37 pp. 153-165.
Gorshkov, et al. “Analysis and elimination of systematic errors originating from Coulomb mutual interaction and image charge in Fourier transform ion cyclotron resonance precise mass difference measurements,” J. Am. Soc. Mass Spectrom., 1993, vol. 4, 855-868.
Hubbard, T. et al., “Ensembl 2005”, Nucleic Acids Research, 2005, vol. 33, Database issue D447-D453.
Ledford, E.B. et al., “Space charge effects in fourier transform mass spectrometry. Mass calibration”, Anal. Chem., 1984, 56:2744-2748.
Marshall, et al. “Fourier transform ion cyclotron resonance mass spectrometry: A primer,” Mass Spectrometry Reviews, 1998, vol. 17, 1-35.
Marshall, et al. “Petroleomics: The next grand challenge for chemical analysis,” Acc. Chem. Res., 2004, vol. 37, 53-59.
Masseslon, C. et al., “Mass measurement errors caused by “local” frequency perturbations in FTICR mass spectrometry”, Journal of the American Society for Mass Spectrometry. 2002, 13:99-106.
Meek, “Prediction of peptide retention times in high-pressure liquid chromatography on the basis of amino-acid compositon,” Procceedings of the National Adademy of Sciences, 1980, 77(3): 1632-1636.
Meier, J. et al., Pure absorption-mode spectra from Bayesian maximum entropy analysis of ion-cyclotron resonance time-domain signals. Analytical Chemistry 1991 vol. 63 pp. 551-560.
Pardee, “Calculations on paper chromatography of peptides,” The Journal of Biological Chemistry, 1951, 190:757-762.
Sylwester et al., ANDRIL-Maximum likelihood algorithm for deconvolution of SXT images. Acta Astronomica 1998 vol. 48 pp. 519-545.
Vining, B.A. et al., Phase Correction for Collision Model Analysis and Enhanced Resolving Power of Fourier Transform Ion Cyclotron Resonance Mass Spectra, Analytical Chemistry, 1999, 71:2, pp. 460-467.
Wool, A. et al., “Precalibration of matrix-assisted laser desorption/ionization-time of flight spectra for peptide mass fingerprinting”, Proteomics, 2002, 2:1365-1373.
Yanofsky, et al. “Multicomponent internal recalibration of an LC-FTICR-MS analysis employing a partially characterized complex peptide mixture: Systematic and random errors,” Anal. Chem., 2005, vol. 7, 7246-7254.
Zhang, et al. “Accurate mass measurements by Fourier transform mass spectrometry,” Mass Spectrometry Reviews, 2005, vol. 24, 286-309.
Zubarev et al., “Electron Capture Dissociation of Multiply Charged Protein Cations. A Nonergodic Process,” J. Am. Chem. Soc., 1998, 120(13): 3265-3266.
Zubarev, “Electron-capture dissociation tandem mass spectrometry,” Current Opinion in Biotechnology, 2004, 15: 12-16.

* cited by examiner

ESTIMATION OF ION CYCLOTRON RESONANCE PARAMETERS IN FOURIER TRANSFORM MASS SPECTROMETRY

This application is a continuation of U.S. Ser. No. 12/302,407, filed Jun. 30, 2009, now issued as U.S. Pat. No. 8,274,043 on Sep. 25, 2012, which claims the priority benefit of PCT/US2007/069811, filed May 25, 2007, which designated the U.S. and that International Application was published under PCT Article 21(2) in English. This application also includes a claim of priority under 35 U.S.C. §119(e) to U.S. provisional application No. 60/808,909, filed May 26, 2006, the contents of all of which are herein incorporated by reference in their entirety.

FIELD OF THE INVENTION

The present invention relates to systems and methods for accurate estimation of the ion cyclotron resonance parameters in Fourier-transform mass spectrometry. It may also have application in nuclear magnetic resonance and other types of spectroscopy. The estimator addresses any signal that can be modeled as a sum of damped oscillations plus white Gaussian noise.

BACKGROUND OF THE INVENTION

Mass Spectrometry

Mass spectrometry is a widely used method for characterizing the composition of complex mixtures. The primary goal of mass spectrometry is to identify molecules by mass or the masses of their fragments. A secondary goal is to determine how much of each type of molecule is present in a mixture. The mass of a molecule is determined by first ionizing the intact molecule, placing it in a force field, and observing some property of its trajectory. Both electrostatic and electromagnetic forces depend linearly upon the ion's charge. Thus, its acceleration in such a field depends inversely on the mass-to-charge ratio (m/z).

Mass Spectrometry Performance Metrics

Metrics used to describe the performance of a mass spectrometry platform include mass accuracy, mass resolving power, sensitivity, and quantification accuracy. Mass accuracy is the most important metric because errors in mass may lead to misidentification of components in a sample. The ability to accurately determine the mass of a low-abundance species, whose signal power is not much greater than noise, is especially important in many applications, e.g., proteomic biomarker discovery. Mass resolving power is another metric, also important because the maximum complexity of a mixture that can be successfully analyzed is limited by the ability to distinguish species with very similar m/z values. Sensitivity limits the ability to observe low-abundance species, which is a particularly important issue when components in a given mixture have widely varying abundances. Quantification accuracy is important in many applications when relative abundances need to be determined. These four metrics are commonly used to assess the relative performance of instruments and data analysis methods.

FTMS

Fourier transform ion cyclotron resonance mass spectrometry (FT-ICR MS or FTMS) is a well-known method that offers higher mass resolution, greater mass resolving power, and higher mass accuracy than other known mass analysis methods. The superior performance of FTMS makes it the method of choice for analyzing mixtures of very high complexity such as blood or oil. The principles of FT-ICR MS are described in A. Marshall, C. Hendrickson, G. Jackson, *Fourier Transform Ion Cyclotron Resonance Mass Spectrometry*: A Primer, Mass Spectrometry Reviews, Volume 17, 1998, pp. 1-35. In FTMS, a magnetic field induces ion cyclotron motion.

A magnetic field will induce an ion whose initial velocity is normal to the field to orbit in a plane normal to the field with a frequency that depends inversely upon the ion's m/z value. Thus, estimates of an ion's orbital frequency can be used to determine its m/z value. If the ion has velocity along the direction of the magnetic field, it would continue to move inertially in this direction. An electrostatic trapping potential that varies quadratically along the direction of the field is applied to confine the ion along this axis.

Orbitrap

A related machine, the LTQ-Orbitrap™, manufactured by Thermo-Fisher Scientific, measures the frequency of oscillation induced by a trapping potential that varies harmonically in one direction; a central electrode, rather than a magnetic field, provides the centripetal force that induces orbital motion in a plane that is normal to the trapping forces. The orbital motion of the ion is used to trap the ion. From a data analysis standpoint, the Orbitrap is a type of FTMS machine, even though it is not always classified as such by mass spectrometrists. The inventive method described herein is equally applicable to Orbitrap data as to data from traditional FTMS instruments. The peak shape for FTMS and Orbitrap signals are both accurately characterized by the same model function. Unless indicated, the two types of peak shapes can be considered interchangeable. The same estimator, e.g. with no modification, can determine ion packet parameters form data collected on either machine. The difference between the FTMS and Orbitrap signals emerges downstream from the inventive estimator in the mass calibration step, as the ion packet frequency has a different dependency on mass-to-charge ratio.

Determining m/z Values from FTMS Signal

Like other types of mass spectrometry, the FTMS signal does not yield a direct measurement of the m/z values of ions. The FTMS signal is a time-dependent voltage signal generated by the difference in the image charge induced by an ion on two parallel conducting detector plates. The voltage varies linearly with the ion's displacement along the line connecting the two plates. In the ideal case of a single ion in a circular orbit (e.g., in the xy-plane), the voltage between two parallel plates (e.g., lying in planes normal to the x-axis) has a sinusoidal time-dependence. To first order, the FTMS signal is a sum of sinusoidal signals, one signal per ion packet, and one ion packet for each distinct m/z value in the mixture. Application of the Fourier transform to a sum of sinusoids produces a frequency spectrum that contains one peak for each sinusoidal component. Because the (complex-valued) Fourier-transform is informationally equivalent to the time-domain signal, it can be referred to as the frequency-domain representation of the signal.

Because the time-domain and frequency-domain representations of the signal are equivalent, estimation can be performed in either domain. However, performing the estimation in the frequency domain is significantly easier. Most of the signal power from an ion packet is concentrated in a narrow band centered at its oscillation frequency. Although signals from various ion packets are completely overlapped in the time domain, signals in the frequency domain are essentially non-overlapped, except in relatively rare cases where two packets have very similar m/z. Nearly all of the information about an ion packet is contained in a relatively small window of frequency samples, allowing rapid computations with high accuracy.

Application of the Fourier transform to separate signals from ions with distinct m/z values into distinct peaks is the distinguishing property of FTMS. The position of each peak in the frequency spectrum (i.e., its frequency) indicates the m/z value of the ion, and the magnitude indicates its relative abundance. Signal processing is necessary to precisely determine the magnitude and frequency of each ion packet signal. The precise position of the peak is obscured by several factors, including the finite duration for which the signal is observed, the decay of the signal amplitude over time, and the electronic noise in the measurements. Accordingly, there is a need in the art to design an estimator to accurately determine values of the desired parameters.

Magnitude-Based Methods

Existing methods for extracting information from FTMS data do not make use of the complex-valued Fourier transform. These methods instead use the magnitude-mode spectra. A complex number, like an observed value of the Fourier-transform, can be characterized by the values of its real and imaginary components, or equivalently, by its magnitude and phase. The magnitude of a complex number is the square-root of the sum of the squares of the real and imaginary components. A magnitude-mode spectrum can be thought of as removing the phases from each Fourier-transform sample. Thus, the magnitude-mode spectrum contains exactly half the information of the complex-valued spectrum.

The magnitude-mode spectrum is phase-invariant, meaning that it is independent of the initial phases of the ion packets, except for effects of signal overlaps, which are not directly modeled in these magnitude-based methods. Although phase-invariant analysis leads to simpler computations, removing the phase dependence destroys valuable information. For example, the phases of the ion packets could be used to compute absorption spectra, whose peaks are roughly half as wide as corresponding peaks in magnitude-mode spectra, resulting in a two-fold gain in mass resolving power.

Zero-padding is a computational trick used to recover the information lost by removing phases. Although phase information can be recovered in theory by zero-padding, removal of the phases ultimately diminishes all aspects of mass spectrometry performance. Zero-padding can be viewed in the time-domain as appending N zeros to the end of N observed samples or equivalently, calculating the samples of the Fourier transform at intervals of 1/(2T) rather than 1/T. That is to say, magnitude values are calculated halfway in between observed transform values. The complex-valued samples halfway in between observed values are not independent; rather, they can be computed as linear combinations of the observed values. However, the set of magnitudes produced by this process are independent. It can be shown that the N Fourier transform magnitudes produced by zero-padding are informationally equivalent to the N/2 complex-values of the unpadded Fourier transform. However, zero-padding has the undesirable property of introducing sidelobes to the tails of the peaks. That is, the magnitude samples no longer decrease monotonically as the distance from the peak centroid increases, but instead bob up and down every other sample.

The wiggling associated with each ion packet signal typically confounds peak detection algorithms by introducing numerous local maxima in the spectrum. Application of an apodization filter can reduce the wiggling artifact. Apodization filters can be designed to eliminate adjacent sidelobes, but they have the undesirable property of broadening the peak. Peak broadening reduces the mass resolving power of the mass spectrometer, as well as the mass accuracy.

Furthermore, calculation of the magnitude-mode spectrum involves the application of non-linear operations upon the Fourier-transform. As a result, the analysis of noise becomes problematic: observed magnitudes are Rayleigh-distributed, while the Fourier-transform values are Gaussian distributed. Analysis of Gaussian-distributed observations is conceptually and computationally much simpler.

An Alternative Model-Based Approach

A model-based approach for analyzing FTMS spectra has been described in the literature (Giancaspro and Comisarow, 1983). In this method, three parameters describing a magnitude-Lorentzian curve are fit (exactly) to the three samples of highest-magnitude in a magnitude-mode spectrum. In the absence of noise, the estimated parameters would give the exact ICR frequency and amplitude of the observed peak. However, the technique is not robust in the presence of noise. In fact, even a relatively small amount of noise can cause critical instability in the estimator. For example, it is possible for the estimated peak height to approach infinity or for there to be no Lorentzian curve that passes through a set of noisy observations.

Giancaspro and Comisarow attempted to model absorption spectra also, recognizing the potential for additional performance gains. The authors observe, however, that the magnitude-Lorentzian peak cannot be used to fit an absorption spectrum. This result is not surprising: the two functions are different, and one would not be expected to fit the other. The differences between the functions decrease as the observation duration increases. However, typical observation durations are such that these differences between the models are substantial. As a result, as the paper points out, parabolic models achieve similar mass accuracy under typical conditions for FTMS data collection.

It is unlikely that any commercially available FTMS data analysis methods make use of the prior art method of Giancaspro and Comisarow or any other model-based method. Possibly, the prevailing view in the field is that estimating frequency by parabolic fit (see below) is as good as, or superior to, model-based approaches, as a result of this misleading paper. Accordingly, there is a need in the art to correct the flaw in the above prior art method by using the theoretical absorption and dispersion spectra, rather than a magnitude Lorentzian to model the real and imaginary components of the observed Fourier transform.

Heuristic or Model-Free Methods

The most prevalent method for determining ion frequencies is to fit a parabola to the three largest values in the zero-padded magnitude-mode spectrum in the region of a detected peak and then taking the frequency coordinate of parabola's vertex to be the frequency estimate (FIG. 5). One can interpret the parabola as an implicit model for the peak shape in this method. For a small enough neighborhood, any maximum can be approximated by a parabola. However, the quality of the approximation is limited by the size of the region (1/T, where T denotes the observation duration). Even in such a small region, the approximation is significantly outperformed by a superior peak-shape model. Outside of this narrow band of frequencies, the parabolic model does not provide an even moderately accurate model of the peak shape. As a result, it is not possible to use these observations in determining the ion frequency.

Because the parabola-based estimate uses three parameters to fit three points, it is highly sensitive to noise in the observations. It is also unable to detect anomalies in the observed peak shapes caused by false detection or overlap between adjacent signals. The magnitude (and thus the relative ion abundance) of the packet are not determined optimally using the parabolic model. The parabolic model cannot be used for abundance estimation, which requires modeling of the peak shape over a larger band of frequency, i.e., outside a small neighborhood around the frequency maximum.

In theory, the ion packet abundance can be estimated from the area under the peak in the absorption spectrum or equivalently in the complex-valued Fourier transform. In practice, this technique suffers from the coarse sampling of the peak, and accurate interpolation is not possible without a peak-shape model. Furthermore, the peak has long tails that are difficult to integrate in the presence of noise and adjacent peaks.

Accordingly, there is a need in the art to design a technique to accurately estimate the parameters that describe ion packet trajectories with very high accuracy. Accurately estimating these parameters leads to accurate identification and quantification in complex mixtures.

SUMMARY OF THE INVENTION

The present invention provides a method and a system that estimates ion cyclotron resonance parameters in Fourier transform mass spectrometry. The parameters estimated include initial magnitude, frequency, initial phase, and decay constant. According to the inventive parameter estimation method, a set of parameters is found that maximizes the likelihood of the observed complex-valued frequency spectrum. The estimated values can be used to identify molecules in a complex mixture and quantify their relative abundances. For example, an accurate estimate of the mass of an ion may be obtained by estimating the ion's cyclotron parameters, including initial magnitude, frequency, initial phase, and decay constant, according to the estimator described herein, and converting the estimated parameters into a mass-to-charge ratio by mass calibration. An estimate of the mass of an ion is available after calibration. The accuracy provided by this estimator exceeds existing methods. The improved accuracy has important consequences in applications where high analytical performance is required, e.g., proteomic biomarker discovery.

DETAILED DESCRIPTION OF THE INVENTION

Model-Based Estimation

An accurate physical model of the data observed in mass spectrometry forms the basis for the estimator described herein. The invention is an estimation process based upon a physical model of FTMS data collection. An estimation process is necessary to extract information from observed data when the observations do not directly provide the values of the desired parameters. In mass spectrometry, the desired parameters are the mass-to-charge ratios and the abundances of the ions. The observations, however, are voltages induced the motions of ions. It is a technical point, but one worth noting, that a non-trivial calibration step is required to determine the m/z values of the ions from the estimated frequencies. Calibration can be performed a number of ways, including the method disclosed in International Patent Application No. PCT/US/2006/021321, Publication No. WO 2006/130787 entitled Method for Simultaneous Calibration and Identification of Peptides in Proteomic Analysis which is incorporated herein by reference. The estimator, described in the instant invention, does not address this calibration step. The estimator provides the ion frequency, along with other parameters, including the ion abundance, and assumes that the estimated frequencies will be provided to a calibrator.

Model-based estimation involves the specification of a random process model that assigns probabilities to the possible outcomes that could result by observing the system in a particular configuration. The system configuration is specified by assigning values of a set of model parameters. The random nature of the measurement process reflects the fact that the process, as specified by the model parameters, is not deterministic, or equivalently that the model parameters do not provide a complete characterization of the system. Often the random measurement is expressed in terms of an ideal measurement, a deterministic function relating model parameters to measurement values, to which a random noise term is added.

When the outcomes lie in a continuum, as they do for analog voltage measurements, the system model is a probability density function that assigns non-negative values to measurement outcomes for any given system configuration. This probability density function is called the data likelihood.

An estimator is designed to provide optimal estimates, and so some optimality criterion is required. The most commonly used criterion is maximum (data) likelihood. For any system configuration, i.e., a combination of values of the model parameters, one can compute the likelihood that measurement of the system would produce a given set of observed data. For no other system configuration is the observed data a more likely outcome than it is for the system specified by the model parameter values given by maximum-likelihood estimates. In the important special case where the measurements result from an ideal (noise-free) signal plus white Gaussian noise, maximum-likelihood estimation is equivalent to least-squares estimation. In least-squares estimation, the optimal model minimizes the sum of the square differences between the ideal measurements and the observed measurements.

Signal Model

The relationship between the trajectories of ion packets in the FTMS instrument, the time-dependent signal, and its equivalent frequency spectrum representation is well-understood A model for the time-dependent FTMS signal (Comisarow 1976, Comisarow 1978, Marshall 1979) provides the framework for accurately characterizing the FTMS signal. The Marshall-Comisarow model shows excellent correspondence with data collected on modern FTMS instruments (e.g., LTQ-FT™ and LTQ-Orbitrap™, both manufactured by Thermo-Fisher Scientific).

The features of the model relevant to the inventive system and method can be summarized as follows: The time-dependent voltage signal produced by an ion packet, whether in an FTMS instrument or an orbitrap, is the product of three factors: a sinusoid, a decaying exponential, and a square window function (FIGS. 1 and 2). The decaying exponential models the loss of signal intensity due to a number of factors including ion-neutral collisions and expansion of the ion packet. The square window is a function with a value of one during the observation interval (i.e., from 0 to T) and zero outside the interval. The total (ideal) signal produced by a collection of packets is simply the sum of the signals from individual packets. The observed signal is modeled as the ideal signal, sampled at a given uniform time interval (e.g., $\Delta t \sim 1\ \mu s$), plus white Gaussian noise (i.e., with mean zero and variance $\sigma^2$).

The above signal model describes finite, noisy observations of a mixture of damped oscillators. The inventive estimator system and method described here, for the specific application to FTMS, is, in fact, applicable to this broad class of signals that model a variety of physical systems and measurement devices.

The Fourier transform is a useful tool for analysis of signals that are mixtures of sinusoidal (or approximately sinusoidal) signals. The Fourier transform of a time-domain signal is a complex-valued function of frequency. The real and imaginary part of the spectra are the overlap between either cosines or sines respectively and the time-dependent signal (FIG. 3). The real component for an in-phase ion packet (i.e., a packet that passes a reference detector at t=0) is called the absorption spectrum; the imaginary component is called the dispersion spectrum. Ion packets with arbitrary phase can be expressed as linear combinations of the absorption and dispersion spectra.

The Fourier transform of the ion packet signal model described above has a closed-form expression, thus simplifying subsequent calculations. Because the Fourier transform is a linear operation, the total (ideal) frequency spectrum from a mixture of ions is the sum of the frequency spectra produced by individual ion packets.

Because the time-domain signal is finite (observed for a duration of time T), the values of the resulting spectrum can be observed only at integer multiples of 1/T. Values of the spectrum in between the frequency samples can be inferred, i.e., as linear combinations of the observed samples, but not directly observed. The sampling of the time-dependent signal has the effect of limiting the observable part of the spectrum to a frequency window of size $1/\Delta t$. In addition, because the spectrum from a real-value signal has conjugate symmetry, the spectrum is uniquely specified by samples in a region of $1/(2\Delta t)$. In summary, if the time-domain signal consists of N (real-valued) observations; the frequency spectrum can be specified by N/2 complex-values, each having a real and imaginary part, corresponding to the Fourier transform values at regularly spaced intervals of frequency.

The properties of noise in the frequency domain can be determined from the properties of the noise in the time domain. Key properties that simplify this analysis are the linearity of the Fourier transform, additivity of the noise, and the invariance of the Gaussian form under linear operations. Additive white Gaussian noise in the time-domain with mean zero and variance $\sigma^2$ is transformed into white Gaussian noise in the frequency domain. The real and imaginary parts of the noise are independent and each has mean zero and variance $\sigma^2/2$.

Parameters for Modeling FTMS Signal

Five parameters specify the FTMS signal produced by an ion packet: frequency, initial magnitude, initial phase, decay constant, and duration. The word "initial" refers to the instant at which detection of the signal begins. The initial magnitude of the signal depends upon the initial amplitude of the oscillation and the number of ions. FTMS instruments and the Orbitrap have been designed so that all ion packets have the same initial amplitude, so that relative initial signal magnitudes can be interpreted as relative ion abundances. The phase of the signal refers to the angular position of the particle in its oscillation cycle. For example, the phase for a circular orbit corresponds to the solid angle swept out since completing the last full cycle, i.e., when it passes the detector that is arbitrary designated as the reference detector. The observation duration is known and identical for all ion packets; the other four parameters are estimated for each packet.

This invention corrects the flaw in the prior art model-based approach for analyzing spectra by using an absorption spectrum model (rather than the magnitude Lorentzian) to model observed absorption spectra. To be precise, both the real and imaginary components (e.g., absorption and dispersion spectra) are modeled.

Advantages of this Invention

A physical model previously described in the literature for the time-dependent FTMS signal can be used to calculate a model for the peak shape, represented by the complex-valued Fourier transform, rather than a magnitude-mode spectrum. Because this peak shape has very high correspondence to the Fourier transform of observed FTMS data (FIG. 6), it is possible to design estimators that describe ion packet trajectories with very high accuracy. Accurately estimating parameters that describe these ion packets leads to accurate identification and quantification in complex mixtures.

The ability to describe the entire peak shape accurately, including the tails of the peak, allows a relatively large number of independent observations to be used in calculating estimates. As a result, it is possible to average out noisy fluctuations that occur in individual observations. In addition, it is possible to identify detected features that do not conform to a model for the signal produced by a single ion packet. In some cases, the lack of correspondence is due to the presence of a second (less abundant) ion packet, which was not observable directly, but only in the distortion caused by its overlap with the primary peak.

Parameter estimates that do not explicitly account for the presence of a secondary overlapping signal may have potentially large errors. A large error in one frequency estimate can corrupt the mass estimates for all ions in a given scan at the mass calibration step: mass calibration uses all frequency estimates in a scan simultaneously to assign masses. Estimation methods that do not employ an explicit signal model are unable to suppress noise or identify anomalous signals. For example, a parabola always fits three points exactly, regardless of whether noise or an interfering signal is present.

The parameters estimated for each ion packet by this inventive method are initial magnitude, frequency, initial phase, and decay constant. The four parameters specifying an ion packet signal must be estimated jointly because errors in the estimated values are coupled. For example, an accurate frequency estimate requires accurate estimates of the other three values. Mass spectrometry performance improves with the accuracy of the estimates of the first three parameters. The fourth parameter, decay constant, is a so-called "nuisance parameter." Because it is tightly coupled to the initial magnitude, an accurate estimate of the decay constant is necessary to accurately estimate initial magnitude. The information provides by the other three parameters is summarized below.

The initial magnitude provides an estimate of relative ion abundance. Because of the high correspondence with the model, and the problems with existing methods for estimating initial magnitude (see above), it is expected that the use of this invention will yield significant gains in quantification accuracy.

The frequency estimate is used to calculate an ion's m/z value which is ultimately used to identify the molecule. Use of the inventive system and method achieves a roughly 30% increase in mass accuracy over Thermo's XCalibur™ program as a result of the improved frequency estimates provided by this invention. For mass accuracies in the range of 1 part-per-million, a mass accuracy gain of 30% leads to a substantial gain in the rate of correct identifications of human tryptic peptides by accurate mass measurement.

The estimated (non-zero) phase of an ion packet can be used to calculate its absorption spectrum. Peaks in the magnitude spectrum are approximately 60% wider than corresponding peaks in the absorption spectrum. Furthermore, use of the complex-valued frequency spectrum, rather than the magnitude-mode spectrum, eliminates the need for apodization. Apodization, as implemented in XCalibur™, causes peaks to broaden by an additional factor of 60%. The use of this invention, rather than XCalibur™, results in improvement of mass resolving power by about 150%. Characterization of the phase relationships among peaks may also lead to improvements in detection sensitivity and mass accuracy.

In addition to the observed and expected improvement in performance metrics, this invention provides a rational basis for predicting how various metrics will change under various conditions, including observation duration, neutral gas pressure in the FTMS cell, and signal-to-noise ratio for ion packet signals. The avoidance of non-linear operations, like magnitude calculations, preserves the zero-mean Gaussian distribution of noise. As a consequence, application of the maximum-likelihood criterion reduces to convenient and robust least-squares estimation.

In one embodiment of the present invention, a system and method comprises an automatic parameter-estimation program that finds the optimal "truncated Lorentzian" model that maximizes the likelihood of an FTMS spectrum. A Lorentzian is the Fourier transform of a time-domain signal that is the product of a sinusoid and a decaying exponential. The "truncated" Lorentzian is the Fourier-transform of a similar time-domain signal, which is defined only for a finite range of times (i.e. 0 to T), i.e., a signal truncated in time.

More particularly, in one embodiment of the invention, a maximum-likelihood estimator derived mathematically from a probabilistic model of the voltage signal produced by an ion in an FT-ICR MS is implemented. The projection of the ion trajectory is a sinusoid with fixed frequency and exponentially-decaying amplitude, characterized by a decay time-constant; the voltage is proportional to the measured component of the ion position, plus additive white Gaussian noise. The estimator is an iterative algorithm for finding the point where the partial-derivatives of the data likelihood with respect to four model parameters (i.e., initial magnitude, frequency, initial phase, and decay constant) are simultaneously equal to zero. This set of parameter values maximizes the data likelihood. The duration of the observation of the signal is a fixed known parameter in the model. An estimator based upon this physical model has not heretofore been successfully implemented. Accordingly, the system and method of the present invention whereby the inventive estimator is implemented reduces roughly thirty percent the measurement error in m/z, relative to what could be experimentally achieved using the conventional method when both are applied to FTMS data that are collected (0.42 vs. 0.61 ppm rmsd, respectively).

The technique of the instant invention can be implemented with software. Such software can be stored on any conventional media for such purpose, it may be available and/or downloadable online, and/or it may reside on a computer or instrumentation as will be readily appreciated by those of skill in the art. The inventive technique can be used in connection with numerous mass spectroscopy machines, including FT-ICR and orbitrap.

A computer readable medium having computer executable instructions for estimating ion cyclotron resonance parameters is also contemplated herein. The computer readable medium having computer executable instructions for estimating ion cyclotron resonance parameters comprises obtaining a voltage signal produced by one or more ions in a mass spectrometer wherein the detected spatial component of the ion trajectory is a sinusoid with fixed frequency and exponentially decaying amplitude characterized by a decay time constant, and the voltage is proportional to the measured component of the ion position plus additive white Gaussian noise; and finding the point where the partial derivatives of the data likelihood of the parameters consisting of initial magnitude, frequency, initial phase, and decay constant are all equal to zero from the voltage signal by using an iterative algorithm; wherein the parameter values obtained maximize the data likelihood. The duration of the observation of the voltage signal in the computer readable medium having computer executable instructions for estimating ion cyclotron resonance parameters may be fixed and known.

A FTMS machine comprising computer readable media having computer executable instructions for estimating ion cyclotron resonance parameters is also contemplated herein. The computer readable medium having computer executable instructions for estimating ion cyclotron resonance parameters on the FTMS machine comprises obtaining a voltage signal produced by one or more ions in a mass spectrometer wherein the detected spatial component of the ion trajectory is a sinusoid with fixed frequency and exponentially decaying amplitude characterized by a decay time constant, and the voltage is proportional to the measured component of the ion position plus additive white Gaussian noise; and finding the point where the partial derivatives of the data likelihood of the parameters consisting of initial magnitude, frequency, initial phase, and decay constant are all equal to zero from the voltage signal by using an iterative algorithm; wherein the parameter values obtained maximize the data likelihood. The duration of the observation of the voltage signal in the computer readable medium having computer executable instructions for estimating ion cyclotron resonance parameters may be fixed and known.

EXAMPLES

Figure 1:
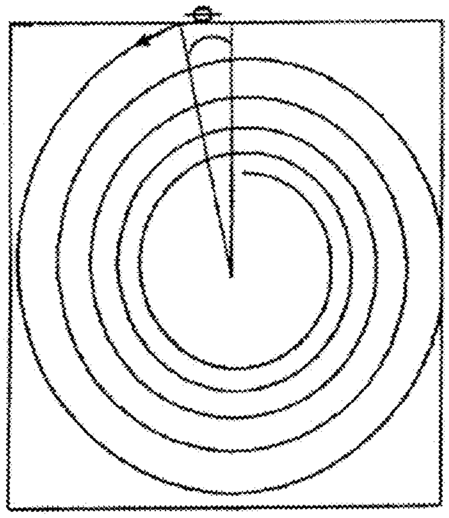
FIG. 1 illustrates an ion trajectory, e.g., the ion path in a Fourier transform cell. The ion moves in an inward spiral due to collisions, characterized by decay constant $\tau$.
Figure 2:
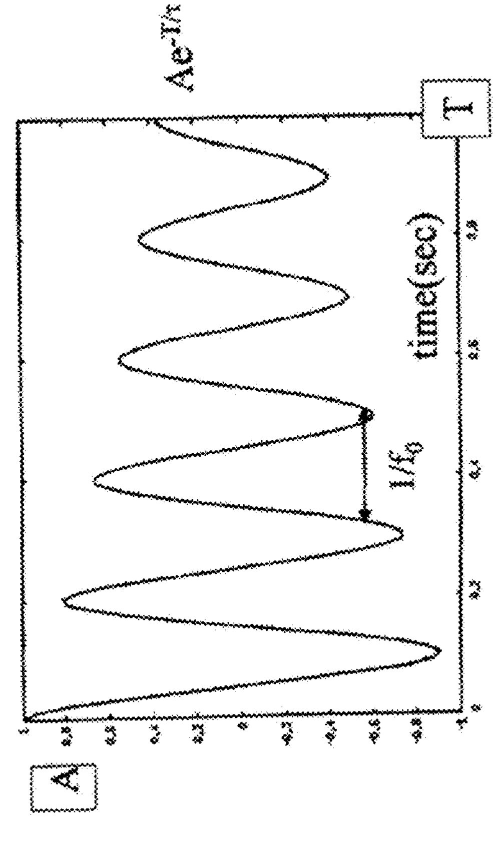
FIG. 2 illustrates a transient FTMS voltage signal of a single ion packet.
Figure 3:
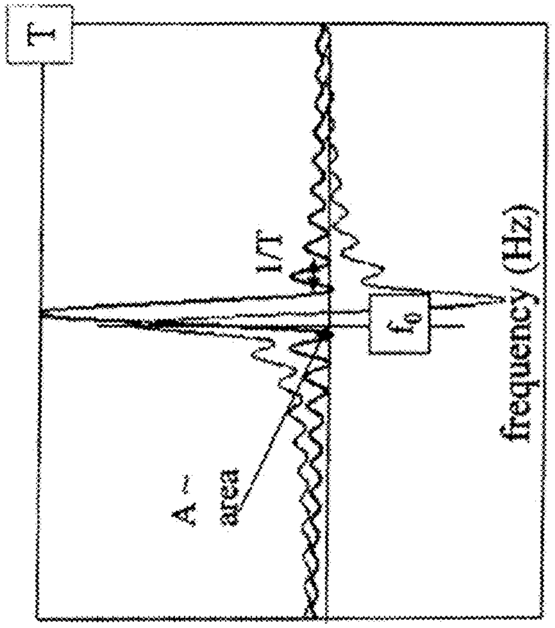
FIG. 3 illustrates the Fourier transform of the FTMS voltage signal, the complex-valued frequency-domain signal. The two curves show the real and imaginary components of the transform called the absorption and dispersion spectra, respectively.

The following examples describe a range of applications of the system and methods of the present invention, as well as a number of components that may be readily integrated and/or otherwise used in connection with the same. These examples demonstrate implementation of some of the inventive systems and methods, and the potential impact they may have on the conventional practice of medicine.

Example 1

In one experiment, ion packets from thirteen peaks, comprising various charge states (i.e., z=1, 2, 3) of a mixture of five peptides of known mass are detected using a ThermoFisher LTQ-FT™. The parameters for each ion packet are estimated, the estimated frequencies converted to m/z values by least-squares calibration, and the m/z values compared to known theoretical values. An accuracy of 0.42 parts-per-million (ppm) root-mean-squared deviation (rmsd) is achieved. The same data is analyzed by Thermo's XCalibur™ program. Thermo Scientific is an entity that sells the XCalibur™ software. XCalibur™ software is a MSWindows®-based system that provides instrument control and data analysis for Thermo Scientific brand mass spectrometers and related instruments. Frequency estimates are inferred by applying XCalibur's™ m/z values for the same 13 ion packets and the calibration parameters it uses to calculate these m/z values. The frequency estimates generated by XCalibur™ are reconverted to m/z values by the same least-squares calibration parameter estimation described above, and compared to known values. The result is a mass error 0.61 parts-per-million. In this case, the frequency estimates reduce errors in m/z determination by 30%.

Example 2

In one embodiment, the invention relates to a computational pipeline for high-throughput identification of human tryptic peptides from FTMS data. The steps in the pipeline are 1) fast Fourier transform (FFT), 2) detection of ion packet signals, 3) estimation of ion packet parameters (this invention), 4) mass calibration, 5) identification of elemental composition (or exact mass), 6) peptide sequence identification, and 7) protein identification.

Calculation of the FFT is a standard procedure and fast algorithms are widely available. Detection is a key step in processing. The same signal model used for estimation can also serve as a detection filter, providing the ability to discriminate ion packet signals from noisy fluctuations. A good detection filter provides the ability to detect low magnitude signals (i.e., low abundance species) without introducing (many) false positive detections. Most false positives can be confidently removed in subsequent stages at the expense of computational cost which potentially reduces throughput. The estimator described in this invention is applied to detected peaks.

The frequency estimates (the entire set detected in an FTMS spectrum) are fed to a calibration algorithm to convert each frequency value into an m/z estimate. As the charge state (z) of each ion is routinely determined during the detection process, estimates of the mass of each ion (m) are available after calibration. The calibration process has been described in a previous patent application by this inventor, International Patent Application No. PCT/US/2006/021321, Publication No. WO 2006/130787, entitled Method for Simultaneous Calibration of Mass Spectra and Identification of Peptides in Proteomic Analysis, incorporated herein by reference. This process can be summarized as follows:

Typically, two calibration parameters describe a calibration curve that relates an ion's frequency and mass-to-charge ratio. In conventional practice, the parameters are determined by analyzing a sample whose components are specified by the instrument manufacturer and using manufacturer provided software to compute calibration parameters. This process may happen once a month, or in more fastidious labs, once a week.

Calibration parameters vary significantly in every scan, essentially from one second to the next, because ions in the sample feel the repulsive electrostatic force from all other ions loaded into the cell. This force acts in opposition to the centripetal magnetic force, reducing the ion frequency to an extent that varies linearly with the total number of charges loaded in the cell. This phenomenon is called the "space-charge effect." Many mass spectrometers are equipped with an automatic gain control mechanism that attempts to load the same number of ions into the cell in each scan to avoid scan-to-scan fluctuations in the calibration parameters. Despite this compensation for space-charge variations, fluctuations in the frequency for a given ion average about one part per million, contributing the majority of the error in mass measurements, and potentially resulting in many misidentifications in complex samples like human proteomic samples.

The inventive calibrator disclosed in Publication No. WO 2006/130787 referenced above calibrates each scan in real-time without introducing exogenous calibrant molecules. Instead, an iterative scheme alternates probabilistic elemental composition ("exact mass") determination based upon initial estimates of the calibration parameters and mass accuracy and calibration update steps that minimize the expected calibration error. The expectation is taken over the possible peptide elemental compositions.

Existing platforms for identifying peptides rely upon tandem mass spectrometry (MS-2), a process by which peptides are fragmented and the masses of the resulting fragments are measured. The estimated mass of the intact ion, i.e. before fragmentation, is used only as a constraint for analyzing the MS-2 data. This general platform fails to identify all the molecules in a sample because an entire MS-2 spectrum is devoted to identifying one peptide, and so typically only a small fraction of the detected peptides are even assayed. In conventional practice, this creates a strong bias against identifying low-abundance peptides and may explain the failure of this platform to identify a single clinically relevant biomarker. Success rates for peptide identification by MS-2 are below 25%, further reducing proteomic coverage.

The inventive estimator described here, together with the calibrator, provide the ability to estimate peptide mass with sub-ppm accuracy despite noisy fluctuations in the measured voltages and space-charge variations. This is a prerequisite technology for identifying human peptides on the basis mass alone (and perhaps other information available from MS-1 spectra such as the isotope distribution and chromatographic retention time). For example, a database of all human peptides resulting from an ideal tryptic digest of the consensus sequences of proteins can be constructed and used as a lookup table for identifying peptides.

Figure 7:
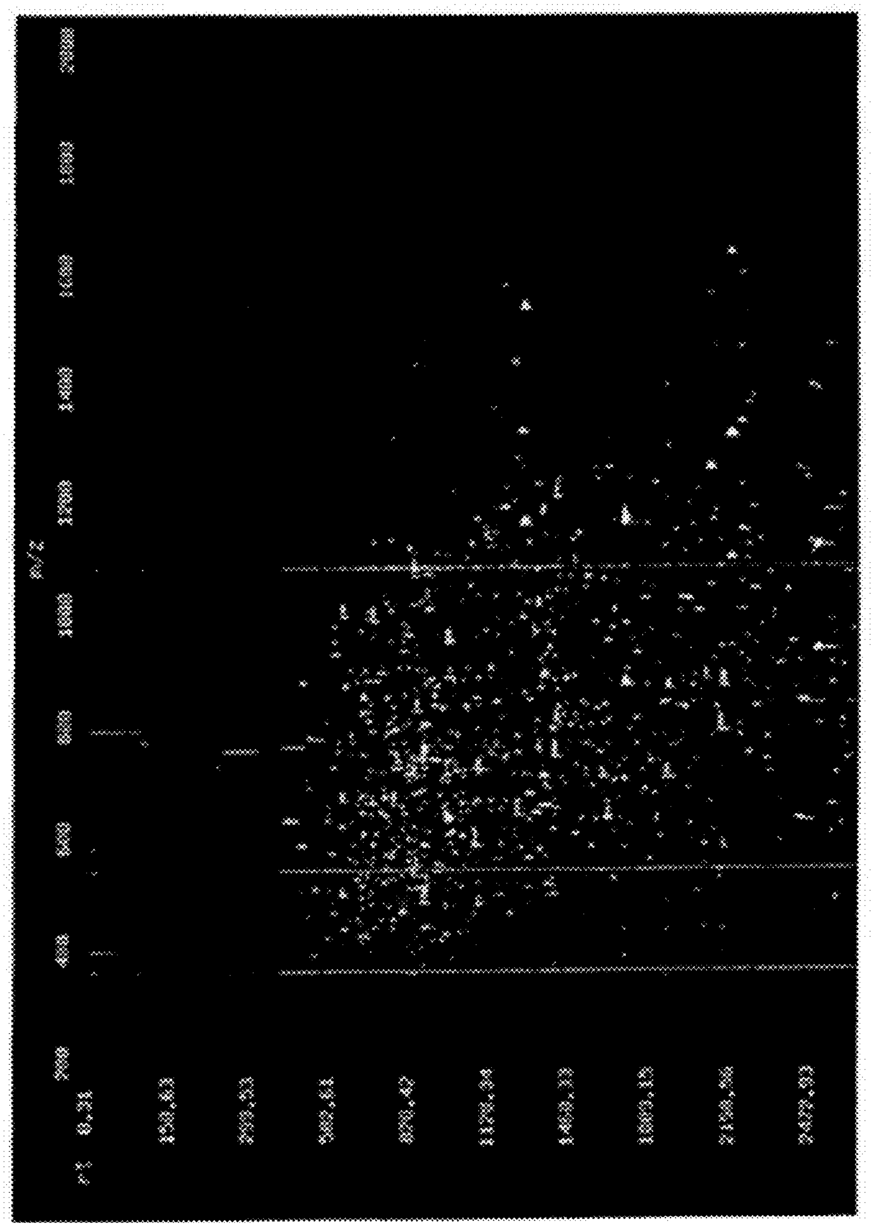
FIG. 7 illustrates a 2-D representation of the data collected in a proteomic experiment. Approximately 6000 fractions are obtained from a sample using liquid chromatography. Each fraction contains a small subset of the entire complement of peptides that happen to elute at a particular instant of time in response to monotonically increasing changes in buffer concentration. Individual mass spectra (horizontal lines) are stacked vertically (retention time) to produce a 2-D image.

One such database, the International Protein Index provided by the European Bioinformatics Institute (EBI-IPI), contains 50,071 human protein sequences. Ideal digestion by the enzyme trypsin cuts proteins after every argininc and lysine residue (unless the next residue is proline). Applying this rule to the protein sequences in the database generates a list of 2,515,788 peptides. These peptides comprise 808,076 distinct sequences, and 356,933 distinct elemental compositions. Each distinct sequence would, in theory, represent a distinct peak position in a 2-D map of the proteome (FIG. 7), where the two axes represent mass and chromatographic retention time. Peptides with the same elemental composition have exactly the same mass, but would have different retention times if their sequences were distinct.

Figure 4:
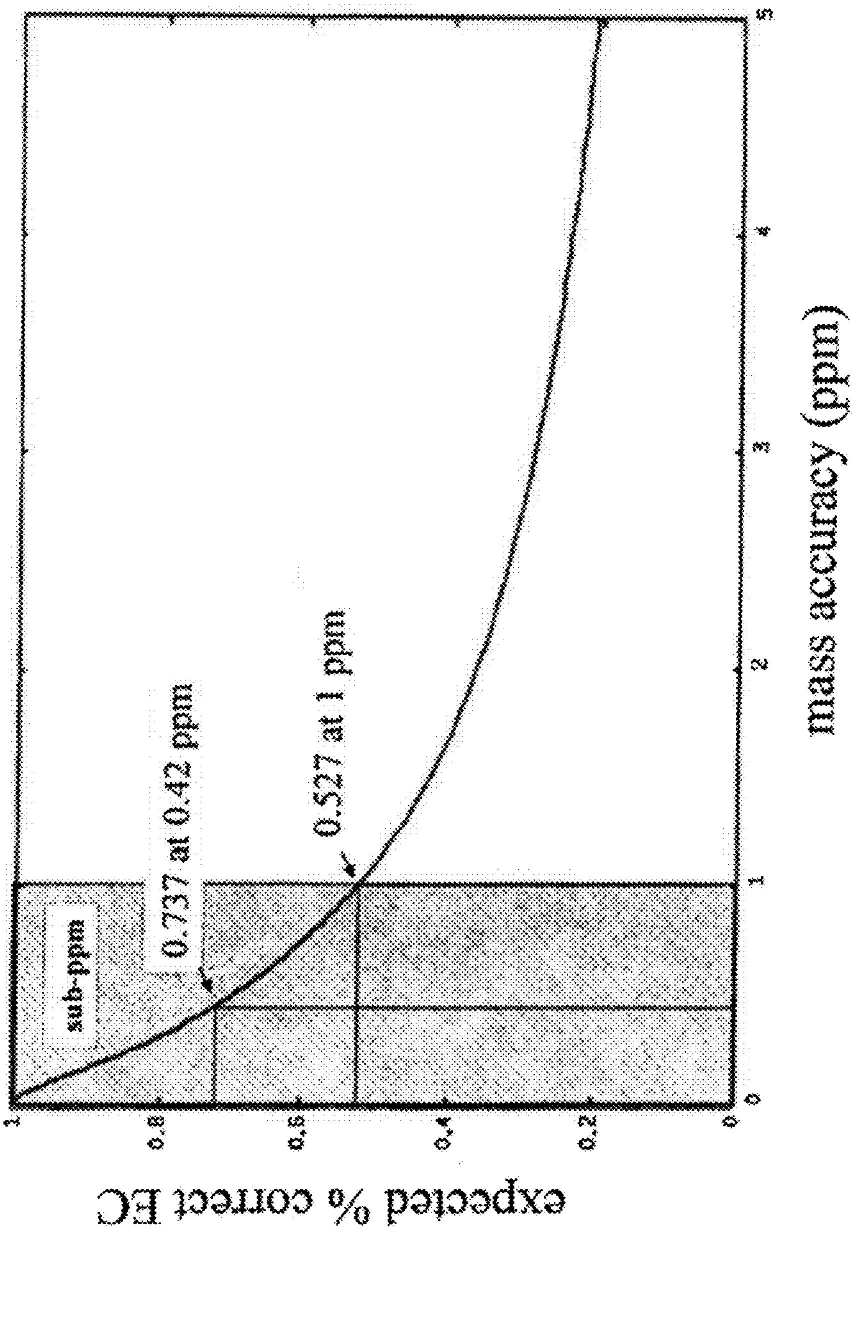
FIG. 4 illustrates that sub-ppm mass accuracy is sufficient to discriminate most (ideal) human tryptic peptide elemental compositions, and that small gains in mass accuracy can lead to substantial gains in the number of correct identifications.
Figure 5:
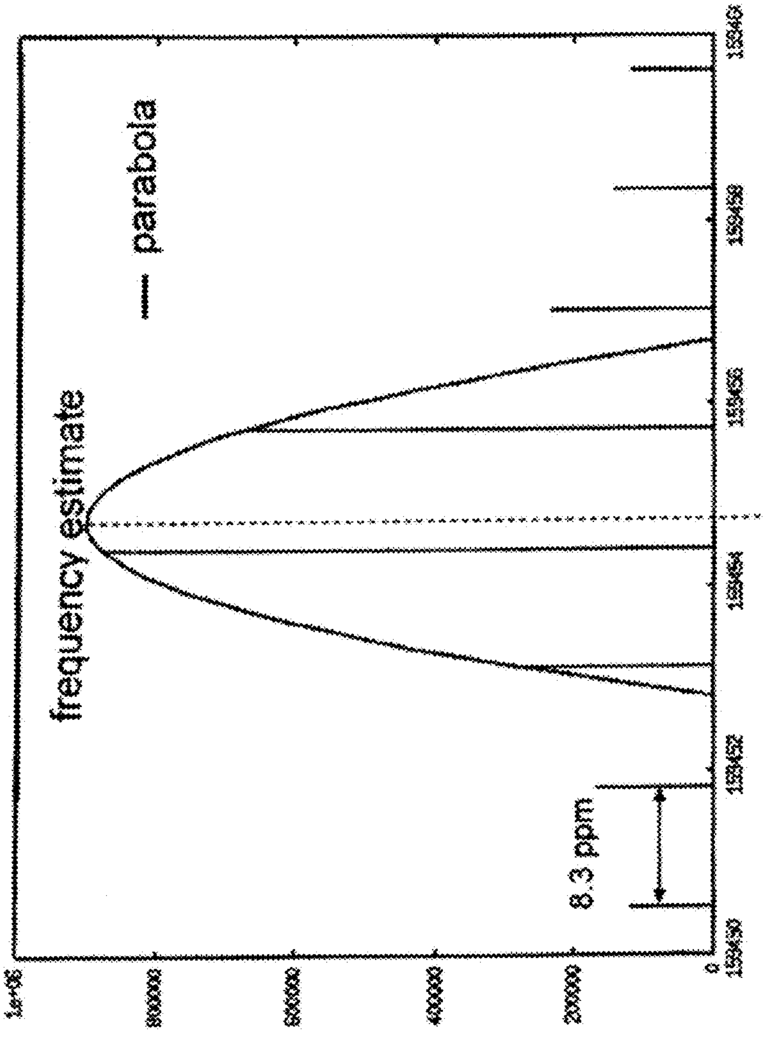
FIG. 5 illustrates the prior art parabolic interpolation that is commonly used to estimate frequency.
Figure 6:
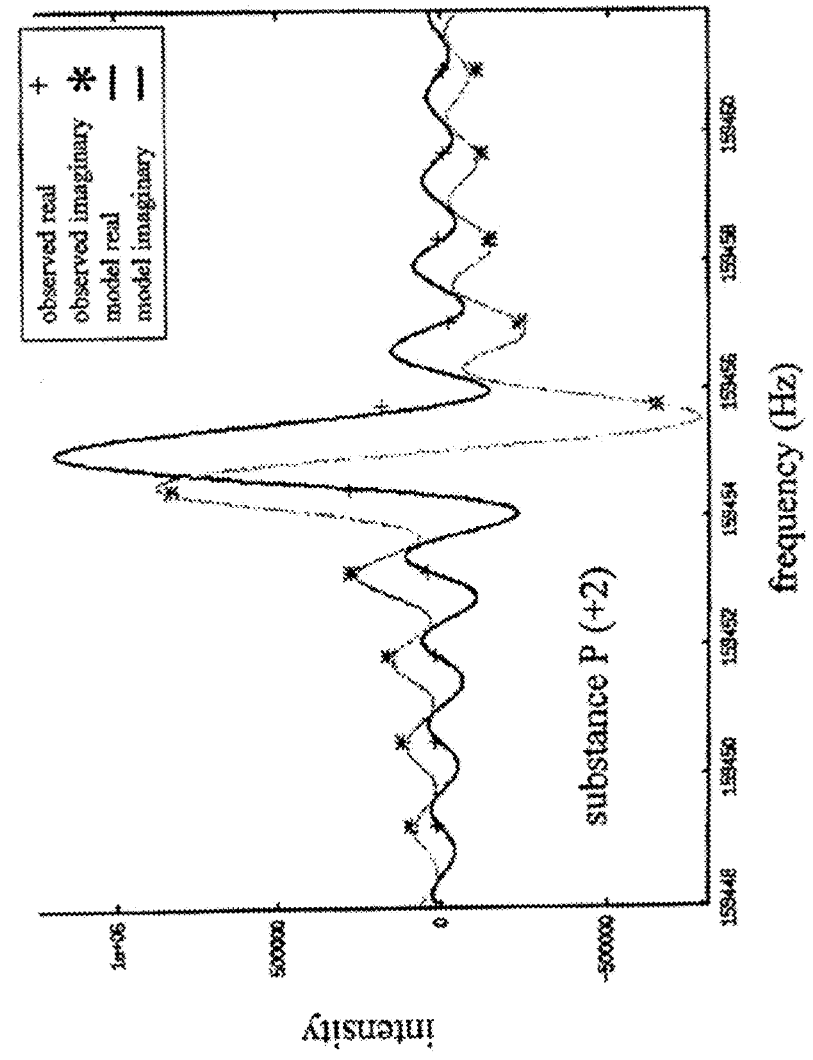
FIG. 6 illustrates that the inventive method fits the observed complex-valued peak spectrum obtained from FTMS.

In principle, given sufficient accuracy in determining these two parameters, it would be possible to discriminate every peptide in this database. FIG. 4 demonstrates how the ability to determine peptide elemental composition by virtue of a mass measurement alone varies with the mass accuracy. Note that the success rate increases from 52% to 74% when the mass accuracy increases from 1 ppm, a standard FTMS benchmark, to 0.42 ppm, which can be achieved on the LTQ-FT using the inventive estimator. The steepness of the curve in the sub-ppm regime argues that small gains in mass accuracy translate to significant gains in peptide identification. Because many peptides in an actual proteomic experiment are not “ideal,” e.g., resulting from sequence polymorphism, mutation, trypsin miscleavage, decay fragmentation, post-translational modification, etc., the required mass accuracy to achieve a given level of performance is even greater than suggested, arguing for the need for improved algorithms.

A peptide sequence that appears one time in the database identifies the protein that contains it. Fifty-nine percent of the 808 k distinct sequences occur once, and thus identify a protein. Therefore, most peptide identifications lead to protein identifications. Twenty-one percent of the 808 k distinct sequences correspond to unique elemental compositions, meaning that knowing the mass exactly (or with sufficient accuracy to infer the exact mass) is often enough to identify proteins.

Another fundamental problem is matching detected peptide signals across multiple runs. Biomarker discovery involves looking at the relative abundance of a peptide across two classes of patients (e.g., normal versus disease). This requires the ability to identify all occurrences of the same peptide across runs. Matching peptides is confounded by random and systematic fluctuations in both ion packet frequency and chromatographic retention time. Accurate methods that reduce the variability in estimates across multiple runs allow peptides to be matched. Thus, a peptide identification made in a previous run (e.g., by MS-2) can be inherited by a peptide in the current run if a confidence match can be made across samples.

The technological advances described in this invention and the calibrator in Publication No. WO 2006/130787 referenced above may lead to the discovery of clinically relevant biomarkers.

Example 3

FTMS is an exquisitely accurate technique for measuring mass, with accuracies at or below one part per million (ppm). FTMS is based upon inducing cyclotron motion of packets of identical ions by a centripetal force field and observing the transient voltage between two conducting detector plates produced as the ion orbits. The mass accuracy achieved by FTMS is limited by the accuracy of the estimates of the parameters of ion cyclotron motion such as initial magnitude, frequency, initial phase, and decay constant, as well as subsequent mass calibration. The latter process describes the conversion of an observed frequency into a mass-to-charge ratio (m/z) and is described elsewhere. In the instant example, the former process is focused upon; namely, constructing an optimal estimate of cyclotron parameters from the Fourier transform of finite, noisy observations of the voltage signal. Each ion packet signal is characterized by its parameters including, but not limited to, initial magnitude, frequency, initial phase, and decay constant. The set of parameter values that maximizes the likelihood of the observed complex-valued transform for each spectral peak is found. Maximum-likelihood estimation according to one embodiment of the inventive system and method leads to significant improvements in mass accuracy.

Let y denote a vector of values of the Fourier transform of an observed voltage signal $$y=[y_1 \ldots y_N]^T \tag{1}$$

where $y_n$ denotes the value of the transform at frequency $f_n$.

Let z denote a vector of values of a function that models the noise-free signal. A generalized model function is further denoted by z at the risk of some ambiguity. Let p denote a set of parameters that indicates a specific function of frequency. The value in row n of vector z is the value of the model function z evaluated at frequency value fn and parameter vector p, corresponding to observation $y_n$.

$$z=[z(f_1;p) \ldots z(f_n;p)]^T \tag{2}$$

It is assumed that y is the sum of a noise-free signal and white Gaussian noise. It is also assumed that the noise-free signal is equivalent to the specific model function indicated by an unknown value of parameter vector p. The maximum-likelihood estimate of p minimizes the squared magnitude of the vector difference between the observed and model values.

$$e(p)=\|z(p)-y\|^2=\sum_{n=1}^{N}(z(f_n;p)-y_n)\cdot(z_n(f_n;p)-y_n) \tag{3}$$

Let $\hat{p}$ denote the maximum-likelihood estimate. The derivative of e with respect to p evaluated at $\hat{p}$ is zero.

$$\left.\frac{\partial e}{\partial p}\right|_{\hat{p}}=2\sum_{n=1}^{N}\mathrm{Re}\left[(z_n(\hat{p})-y_n)\cdot\left.\frac{\partial z_n}{\partial p}\right|_{\hat{p}}\right]=0 \tag{4}$$

In general, Equation 4 does not have a closed-form solution. There are a variety of iterative techniques that converge to a solution of Equation 4. One of these techniques is called Newton’s method.

In each iteration of Newton’s method, the error function is approximated by the second-order Taylor series in the region of the current estimate. Let e' denote the approximate error function, and let $p^{(k)}$ denote the estimate after k iterations.

$$e'(p)=e(p^{(k)})+\left(\left.\frac{\partial e}{\partial p}\right|_{p^{(k)}}\right)(p-p^{(k)})+\frac{1}{2}(p-p^{(k)})^T\left(\left.\frac{\partial^2 e}{\partial p^2}\right|_{p^{(k)}}\right)(p-p^{(k)}) \tag{5}$$

The subsequent estimate of p, $p^{(k+1)}$, is the value of p that minimizes e'.

$$\left.\frac{\partial e'}{\partial p}\right|_{p^{(k+1)}}=\left(\left.\frac{\partial e}{\partial p}\right|_{p^{(k)}}\right)+\left(\left.\frac{\partial^2 e}{\partial p^2}\right|_{p^{(k)}}\right)(p^{(k+1)}-p^{(k)})=0 \tag{6}$$

Therefore, the update rule in Newton’s method is determined by solving for $p^{(k+1)}$ in Equation 6.

$$p^{(k+1)}=p^{(k)}-\left(\left.\frac{\partial^2 e}{\partial p^2}\right|_{p^{(k)}}\right)^{-1}\left(\left.\frac{\partial e}{\partial p}\right|_{p^{(k)}}\right) \tag{7}$$

To solve Equation 4 using Newton's method, the first and second derivatives of the error function e with respect to vector p must be computed. The derivatives of the e in terms of the derivatives of the model function z are written as follows.

$$\frac{\partial e}{\partial p} = 2\sum_{n=1}^{N} \mathrm{Re}\left[(z_n(\hat{p}) - y_n)^* \frac{\partial z_n}{\partial p}\right] \tag{8ab}$$

$$\frac{\partial^2 e}{\partial p^2} = 2\sum_{n=1}^{N} \mathrm{Re}\left[(z_n(\hat{p}) - y_n)^* \frac{\partial^2 z_n}{\partial^2 p} + \left(\frac{\partial z_n}{\partial p}\right)^* \left(\frac{\partial z_n}{\partial p}\right)^T\right]$$

Therefore, the specific application of Newton's method to modeling a signal corrupted by white Gaussian noise involves computing the first and second derivatives of the model function with respect to the model parameters.

According to one embodiment of the inventive system and method, a scaled, truncated Lorentzian is fitted to the observed data.

The Lorentzian function is the Fourier transform of an exponential decaying sinusoid. The Lorentzian is characterized by the decay time constant τ and the frequency of the sinusoid $f_0$. The truncated Lorentzian is the Fourier transform of the same time-dependent signal, but after it has been truncated, i.e., set to zero, for all time values above cutoff value T.

$$\begin{aligned} L_T(f) &= \int_0^T e^{-t/\tau} e^{i2\pi f_0 t} e^{-i2\pi f t}\, dt \\ &= \int_0^T e^{-[1/\tau + i2\pi(f-f_0)]t}\, dt \\ &= \frac{1 - e^{-[1/\tau + i2\pi(f-f_0)]T}}{1/\tau + i2\pi(f - f_0)} \end{aligned} \tag{9}$$

In the limit as T increases to infinity, the truncated Lorentzian reduces to the conventional Lorentzian function.

$$L_\infty(f) = \lim_{T\to\infty} \int_0^T e^{-t/\tau} e^{i2\pi f_0 t} e^{-i2\pi f t}\, dt = \frac{1}{1/\tau + i2\pi(f - f_0)} \tag{10}$$

The truncated Lorentzian $L_T$ is related to the conventional Lorentzian by a multiplicative factor.

$$L_T(f) = (1 - e^{-[1/\tau + 12\pi(f-f_0)]T}) L_\infty \tag{11}$$

The multiplicative factor contains a complex exponential term with amplitude exp(−T/τ) and frequency 1/T. Thus, the truncated Lorentzian oscillates about the values of the conventional Lorentzian. The amplitude and frequency of the difference function decreases as T goes to infinity.

The discrete Fourier transform, formed by the periodic replication of the time-domain [0,T], has non-zero values only for frequencies that are integer multiples of 1/T.

Evaluating Equation 11 at the sample values of the discrete Fourier transform produces an important result: the multiplicative factor is constant on samples of the discrete Fourier transform.

$$\begin{aligned} L_T(n/T) &= (1 - e^{-[1/\tau + i2\pi(n/T - f_0)]T}) L_\infty(n/T) = \\ &(1 - e^{-T/\tau} e^{i2\pi f_0 T}) L_\infty(n/T) \end{aligned}$$

Equation 12 indicates that the samples of the truncated Lorentzian are identical to the values of the conventional (infinite-time) Lorentzian, except for a scale factor. This means that one can identically replicate the sample values of the truncated Lorentzian using the conventional Lorentzian. The same values of τ and $f_0$ are shared by the truncated Lorentzian and the conventional Lorentzian. However, the scale factor difference leads to errors in estimating the phase and amplitude of the voltage signal. Since the amplitude is proportional to the ion abundance, errors in amplitude estimation can cause problems.

To simplify subsequent calculations, an auxiliary variable x is introduced.

$$x = 1/\tau + i2\pi(f - f_0) \tag{10ab}$$

$$L(f) = \frac{1 - e^{-xT}}{x}$$

The value of T is set by the experiment and known. The values of t and $f_0$ are unknown physical parameters that need to be estimated from the data.

To proceed with the estimation process, the first derivative of L with respect to τ and $f_0$ is calculated.

$$\frac{\partial L}{\partial \tau} = \frac{\partial L}{\partial x}\frac{\partial x}{\partial \tau} \quad \frac{\partial L}{\partial f_0} = \frac{\partial L}{\partial x}\frac{\partial x}{\partial f_0} \tag{11a-e}$$

$$\frac{\partial L}{\partial x} = \frac{(Tx+1)e^{-xT} - 1}{x^2}$$

$$\frac{\partial x}{\partial \tau} = \frac{-1}{\tau^2} \quad \frac{\partial x}{\partial f_0} = -i2\pi.$$

Now, the second derivatives of L are calculated.

$$\frac{\partial^2 L}{\partial \tau^2} = \frac{\partial^2 L}{\partial x^2}\left(\frac{\partial x}{\partial \tau}\right)^2 + \frac{\partial L}{\partial x}\frac{\partial^2 x}{\partial \tau^2} \tag{12a-e}$$

$$\frac{\partial^2 L}{\partial f_0^2} = \frac{\partial^2 L}{\partial x^2}\left(\frac{\partial x}{\partial f_0}\right)^2$$

$$\frac{\partial^2 L}{\partial \tau \partial f_0} = \frac{\partial^2 L}{\partial x^2}\left(\frac{\partial x}{\partial \tau}\right)\left(\frac{\partial x}{\partial f_0}\right)$$

$$\frac{\partial^2 x}{\partial \tau^2} = \frac{2}{\tau^3}$$

$$\frac{\partial^2 L}{\partial x^2} = \frac{2 - [(Tx+1)^2 + 1]e^{-xT}}{x^3}$$

The model function z is the truncated Lorentzian, scaled by a complex-valued factor α. An estimate of the unknown parameter α is also necessitated.

$$z(f) = \alpha L(f) \tag{13}$$

Let p denote the vector of parameters.

$$p = [\alpha \tau f_0]^T \tag{14}$$

The first and second derivatives of z can be expressed in terms of $\alpha$, L and the derivatives of L with respect to $\tau$ and $f_0$.

$$\frac{\partial z}{\partial p} = \left[\frac{\partial z}{\partial \alpha}\ \frac{\partial z}{\partial \tau}\ \frac{\partial z}{\partial f_0}\right]^T = \left[L\ \ \alpha\frac{\partial L}{\partial \tau}\ \ \alpha\frac{\partial L}{\partial f_0}\right]^T \quad (15ab)$$

$$\frac{\partial^2 z}{\partial p^2} = \begin{bmatrix} \frac{\partial^2 z}{\partial \alpha^2} & \frac{\partial^2 z}{\partial \alpha \partial \tau} & \frac{\partial^2 z}{\partial \alpha \partial f_0} \\ \frac{\partial^2 z}{\partial \alpha \partial \tau} & \frac{\partial^2 z}{\partial \tau^2} & \frac{\partial^2 z}{\partial \tau \partial f_0} \\ \frac{\partial^2 z}{\partial \alpha \partial f_0} & \frac{\partial^2 z}{\partial \tau \partial f_0} & \frac{\partial^2 z}{\partial f_0^2} \end{bmatrix} = \begin{bmatrix} 0 & \frac{\partial L}{\partial \tau} & \frac{\partial L}{\partial f_0} \\ \frac{\partial L}{\partial \tau} & \alpha\frac{\partial^2 L}{\partial \tau^2} & \alpha\frac{\partial^2 L}{\partial \tau \partial f_0} \\ \frac{\partial L}{\partial f_0} & \alpha\frac{\partial^2 L}{\partial \tau \partial f_0} & \alpha\frac{\partial^2 L}{\partial f_0^2} \end{bmatrix}$$

The operator $$\frac{\partial}{\partial \alpha}$$

is convenient shorthand, but must be treated with caution in implementation. Unlike t and $f_0$, which are real-valued parameters, $\alpha$ is a complex-valued parameter. As a consequence, the operator $$\frac{\partial}{\partial \alpha}$$

is equivalent to the operator $$\left[\frac{\partial}{\partial \alpha_R}\ \ i\frac{\partial}{\partial \alpha_I}\right]^T,$$

where $\alpha_R$ and $\alpha_I$ denote the real and imaginary components of $\alpha$. For example, $$\frac{\partial z}{\partial \alpha} = [z\ \ iz]^T.$$

Therefore, Equations 15ab are rewritten in terms of $\alpha_R$ and $\alpha_I$.

$$\frac{\partial z}{\partial p} = \left[\frac{\partial z}{\partial \alpha_R}\ \ i\frac{\partial z}{\partial \alpha_I}\ \ \frac{\partial z}{\partial \tau}\ \ \frac{\partial z}{\partial f_0}\right]^T = \left[L\ \ iL\ \ \alpha\frac{\partial L}{\partial \tau}\ \ \alpha\frac{\partial L}{\partial f_0}\right]^T \quad (16ab)$$

-continued $$\frac{\partial^2 z}{\partial p^2} = \begin{bmatrix} \frac{\partial^2 z}{\partial \alpha_R^2} & \frac{\partial^2 z}{\partial \alpha_R \partial \alpha_I} & \frac{\partial^2 z}{\partial \alpha_R \partial \tau} & \frac{\partial^2 z}{\partial \alpha_R \partial f_0} \\ \frac{\partial^2 z}{\partial \alpha_R \partial \alpha_I} & \frac{\partial^2 z}{\partial \alpha_I^2} & \frac{\partial^2 z}{\partial \alpha_I \partial \tau} & \frac{\partial^2 z}{\partial \alpha_I \partial f_0} \\ \frac{\partial^2 z}{\partial \alpha_R \partial \tau} & \frac{\partial^2 z}{\partial \alpha_I \partial \tau} & \frac{\partial^2 z}{\partial \tau^2} & \frac{\partial^2 z}{\partial \tau \partial f_0} \\ \frac{\partial^2 z}{\partial \alpha_R \partial f_0} & \frac{\partial^2 z}{\partial \alpha_I \partial f_0} & \frac{\partial^2 z}{\partial \tau \partial f_0} & \frac{\partial^2 z}{\partial f_0^2} \end{bmatrix} = \begin{bmatrix} 0 & 0 & \frac{\partial L}{\partial \tau} & \frac{\partial L}{\partial f_0} \\ 0 & 0 & i\frac{\partial L}{\partial \tau} & i\frac{\partial L}{\partial f_0} \\ \frac{\partial L}{\partial \tau} & i\frac{\partial L}{\partial \tau} & \alpha\frac{\partial^2 L}{\partial \tau^2} & \alpha\frac{\partial^2 L}{\partial \tau \partial f_0} \\ \frac{\partial L}{\partial f_0} & i\frac{\partial L}{\partial f_0} & \alpha\frac{\partial^2 L}{\partial \tau \partial f_0} & \alpha\frac{\partial^2 L}{\partial f_0^2} \end{bmatrix}$$

The expressions for the first and second derivatives of z in Equation 16ab are substituted into Equation 8ab to obtain the derivatives of the error function with respect to the parameters of the truncated Lorentzian. Next, the derivative expressions can be substituted into Equation 7, thus specifying the update step of Newton's method for finding the maximum likelihood estimate of the Lorentzian parameters given the observed data.

To complete the specification of the algorithm, an initial estimate of the parameters is needed. The inventor uses the phase-independent magnitude Lorentzian to estimate $f_0$. The values of this function are independent of the observation duration T at the sample values of the Fourier transform. The logarithm of the magnitude Lorentzian is parabolic. The vertex of the parabola of best-fit to the logarithm of the highest magnitude data point and one point on each side provides a robust initial estimate of $f_0$. The initial estimate of $\tau$ is set to T. A truncated Lorentzian with frequency and decay constant specified by the initial estimates, unit power, and zero phase, and is used as a test function. The initial estimate of $\alpha$ is calculated by taking the inner product of the test function and a region of the spectrum (e.g., 20 samples) centered on a detected peak.

The disclosures of the following references are incorporated herein by reference in their entirety as if fully set forth: M. Comisarow and A. Marshall, *Theory of Fourier transform ion cyclotron resonance mass spectroscopy. I. Fundamental equations and low-pressure line shape, J. Chem. Phys.,* 64(1): 110-19 (1976); A. Marshall et al., *Relaxation and spectral line shape in Fourier transform ion resonance spectroscopy, J. Chem. Phys.,* 71(11):4434-44 (1979); M. Comisarow, *Signal modeling for ion cyclotron resonance, J. Chem. Phys.,* 69(9):4097-104 (1978); and C. Giancaspro and M. Comisarow, *Exact interpolation of Fourier transform spectra, Applied Spectroscopy,* 37(2): 153-156.

While the description above refers to particular embodiments of the present invention, it should be readily apparent to people of ordinary skill in the art that a number of modifications may be made without departing from the spirit thereof. The presently disclosed embodiments are, therefore, to be considered in all respects as illustrative and not restrictive.

What is claimed is:

1. A method for accurately estimating Fourier Transform mass spectrometry signal parameters comprising:

(i) obtaining a time-series of voltage or current measurements of the time-dependent image charge generated upon two or more detector plates by whose motion inside an analyzer is essentially sinusoidal in one or more component directions;

(ii) taking a discrete Fourier transform of the obtained time-series to produce a spectrum; and (iii) constructing maximum-likelihood estimates of a) frequency ($f_0$), b) amplitude $|\alpha|$, c) phase ($\arg(\alpha)$), and d) decay time constant ($\tau$) Fourier Transform mass spectrometry signal parameters from the acquired Fourier Transform mass spectrometry data using as a time-domain model an exponentially decaying sinusoid that has been truncated to zero at the end of a finite acquisition interval of known duration plus additive white Gaussian noise or its equivalent representation as a complex-valued discrete Fourier transform, wherein the Fourier Transform mass spectrometry data is represented either as a time-series of measurements or equivalently as a complex-valued discrete Fourier transform.

2. The method of claim 1, wherein the duration of the observation of the signal is fixed and known.

3. The method of claim 1, wherein the iterative algorithm is performed by software.

4. The method of claim 3, wherein the software is stored on conventional media.

5. The method of claim 1, wherein the mass spectrometer is a Fourier transform ion cyclotron resonance mass spectrometer or a machine that measures the frequency of oscillation induced by a potential that varies harmonically in one direction.

6. The method of claim 1, wherein the estimated Fourier Transform mass spectrometry signal parameters are used to identify molecules in a complex mixture.

7. The method of claim 1, wherein the estimated Fourier Transform mass spectrometry signal parameters are used to quantify the relative abundances of molecules in a complex mixture.

8. A method of obtaining the mass-to-charge ratios of Fourier Transform mass spectrometry parameters by converting the estimated frequencies obtained in claim 1 to mass-to-charge values by mass calibration.

9. A computer readable medium having computer executable components for estimating Fourier Transform mass spectrometry parameters comprising (i) obtaining a time-series of voltage or current measurements of the time-dependent image charge generated upon two or more detector plates by ions whose motion inside an analyzer is essentially sinusoidal in one or more component directions;

(ii) taking a discrete Fourier transform of the obtained time-series to produce a spectrum; and (iii) constructing maximum-likelihood estimates of a) frequency ($f_0$), b) amplitude $|\alpha|$, c) phase ($\arg(\alpha)$), and d) decay time constant ($\tau$) Fourier Transform mass spectrometry signal parameters from the acquired Fourier Transform mass spectrometry data using as a time-domain model an exponentially decaying sinusoid that has been truncated to zero at the end of a finite acquisition interval of known duration plus additive white Gaussian noise or its equivalent representation as a complex-valued discrete Fourier transform, wherein the Fourier Transform mass spectrometry data is represented either as a time-series of measurements or equivalently as a complex-valued discrete Fourier transform.

10. The computer readable medium of claim 9, wherein the duration of the observation of the signal is fixed and known.

11. A Fourier Transform mass spectrometry machine comprising computer readable media having computer executable instructions for estimating Fourier Transform mass spectrometry parameters wherein the computer readable medium having computer executable instructions for estimating parameters on the Fourier Transform mass spectrometry machine comprises ((i) obtaining a time-series of voltage or current measurements of the time-dependent image charge generated upon two or more detector plates ions whose motion inside an analyzer is essentially sinusoidal in one or more component directions;

(ii) taking a discrete Fourier transform of the obtained time-series to produce a spectrum; and (iii) constructing maximum-likelihood estimates of a) frequency ($f_0$), b) amplitude $|a|$, c) phase ($\arg(a)$), and d) decay time constant ($\tau$) Fourier Transform mass spectrometry signal parameters from the acquired Fourier Transform mass spectrometry data using as a time-domain model an exponentially decaying sinusoid that has been truncated to zero at the end of a finite acquisition interval of known duration plus additive white Gaussian noise or its equivalent representation as a complex-valued discrete Fourier transform, wherein the Fourier Transform mass spectrometry data is represented either as a time-series of measurements or equivalently as a complex-valued discrete Fourier transform.

12. The Fourier Transform mass spectrometry machine of claim 11, wherein the duration of the observation of the signal in the computer readable media having computer executable instructions for estimating Fourier Transform mass spectrometry signal parameters is fixed and known.

* * * * *